Feb. 7, 1961
N. STEVENS
2,970,833
MACHINE TOOL CLAMP
Filed July 31, 1959
2 Sheets-Sheet 1
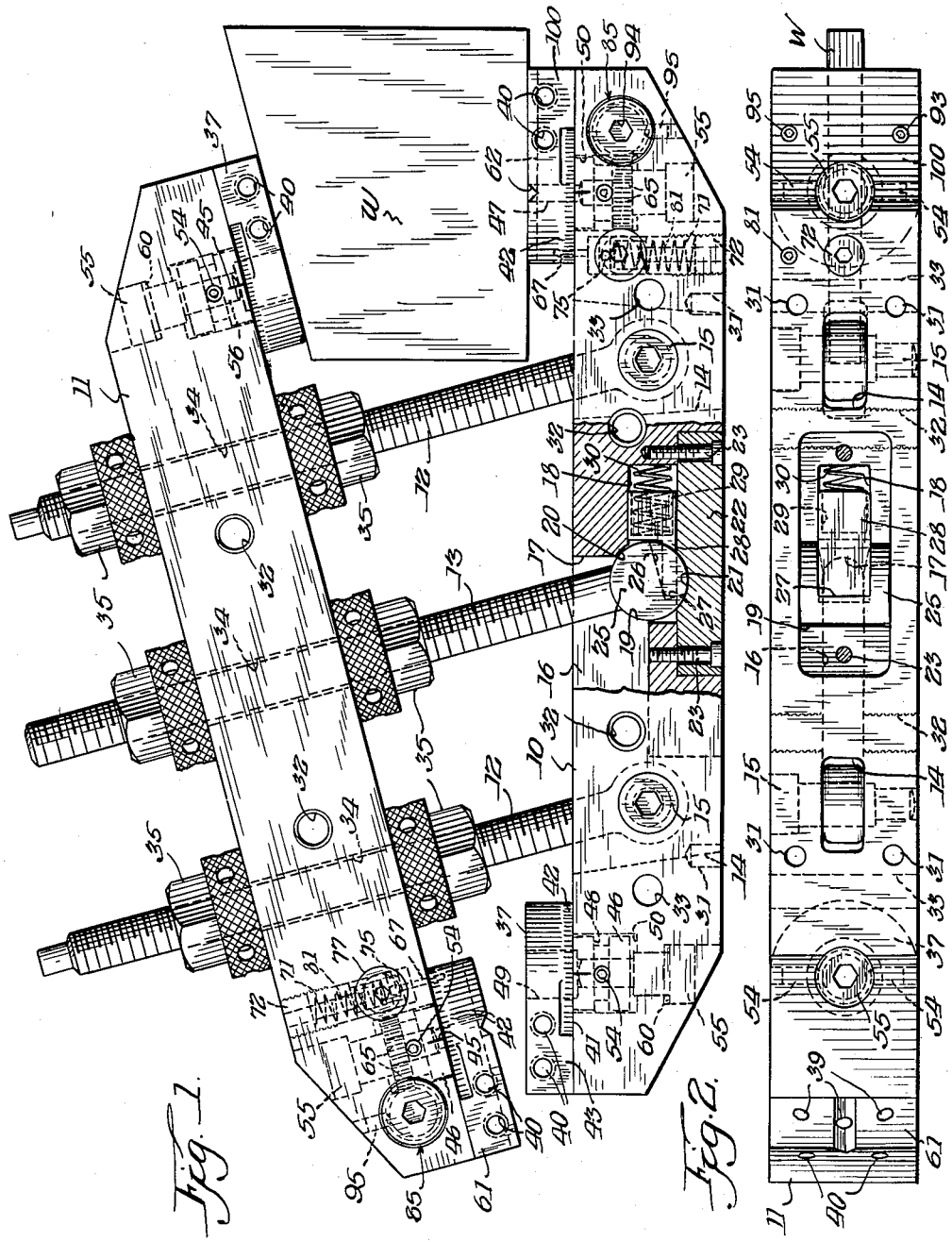
Inventor:
Nichols Stevens.
By Hill & Lee
Attys.

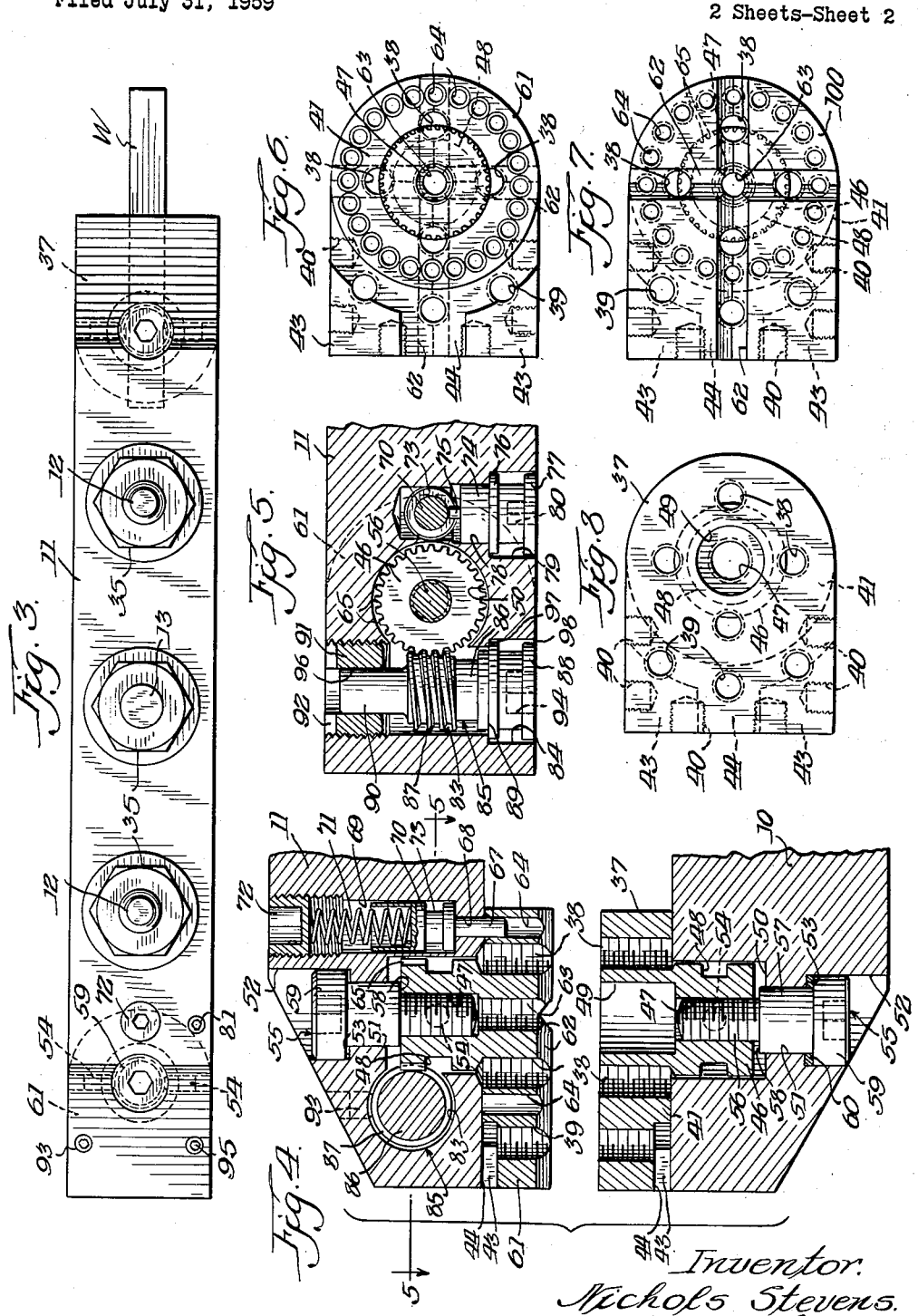

United States Patent Office 2,970,833
Patented Feb. 7, 1961

2,970,833
MACHINE TOOL CLAMP

Nichols Stevens, 2414 N. Spaulding Ave., Chicago, Ill.

Filed July 31, 1959, Ser. No. 830,885

11 Claims. (Cl. 269—189)

The present invention relates to a clamp, and more particularly to a clamp for holding work for machine tool operation thereon.

The objects of the invention are the provision of a clamp which can hold two work pieces simultaneously, which will hold securely work pieces having a taper as great as 15°, which has jaws rotatable to facilitate the positioning of the work quickly and easily for repeated operations at equal intervals, which has wear-compensable means for rotating clamp jaws, which employs novel means for securing the jaws against rotation when desired, and which allows screwing or like securement of work to one jaw without interference with engagement of the opposed jaw on the work.

Other and further objects, and the advantages and features of the invention, will be apparent to those skilled in the art from the following detailed description, taken in conjunction with the accompanying drawings, in which:

Fig. 1 is a side elevational view of a clamp according to the present invention;

Fig. 2 is a bottom plan view of the clamp shown in Fig. 1;

Fig. 3 is a top plan view of the clamp of Fig. 1;

Fig. 4 is an enlarged fragmentary longitudinal section through one end of the clamp showing one pair of opposed jaws in spaced parallel relation;

Fig. 5 is a sectional view taken substantially as indicated by the line 5—5 of Fig. 4;

Fig. 6 is an elevational view showing the reverse face of the jaw shown at the upper left in Fig. 1;

Fig. 7 is an enlarged view of the clamping face of the clamping jaw shown at the lower right in Fig. 1; and Fig. 8 is a similar clamping face view of either of the other two jaws as shown in Fig. 1.

Referring more particularly to Figs. 1 to 3 of the drawings, there is shown a machine tool clamp according to the present invention which comprises a pair of clamping bars 10 and 11 of generally rectangular section and which are adjustably secured together by means of a plurality of threaded clamping pins or bolts 12 and 13. These pins or bolts, of which three are employed in the present instance, are pivotally mounted on the bar 10 to swing about axes extending transversely of the bar and spaced along the length thereof. The bar 10 is formed with a pair of aligned slots 14 located adjacent the opposite ends thereof and preferably extending completely therethrough. The slots are of a width sufficient to receive therein the pivot ends of the pins or bolts 12. These ends of the bolts are apertured for the receptiton of pivot screws 15 which extend through the slots 14, being seated in suitable transverse bores through the bar.

Opening through the face of the bar 10 which is directed toward the corresponding face of the bar 11, which faces for convenience may be designated as the inner faces of the bars, is a slot 16 which may conveniently form an extension of one of the slots 14, but does not have a depth such as to extend completely through the bar. One end of the slot 16 is defined by an abutment surface which is normal to the axis of the bar 10, or in other words perpendicular to the inner face thereof. Extending longitudinally from this end of the slot 16 is a recess 18, and adjacent the juncture of the slot and recess is a transversely extending bore which provides arcuate shoulders 19 on opposite sides of the slot and recess, as well as an arcuate surface 20 at the interior end of the abutment surface 17. An arcuate groove 21 cooperating with the shoulders 19 and surface 20 is formed in the interior face of a cover plate 22, which closes the recess 18, fitting in an enlargement of the recess adjacent the outer face of the bar 10, and secured in place as by screws 23.

The threaded clamping pin or bolt 13 is disposed between the two bolts 12, and has a transverse cylindrical head 25 on the end thereof which extends into the slot 16. This head is engaged on the arcuate shoulders 19 and surfaces 20 and 21 for rotation thereon so that the bolt may pivot to and from a position engaging the surface 17. The head 25 is formed with a recess 26 therein, the bottom of which lies in a chordal plane, and which has one end open to the recess 18 and the other providing a shoulder 27 against which engages the end of a projection formed on a slide member 28 movable longitudinally in the recess 18. The slide member has a hollow portion 29 receiving one end of a compression spring 30, the other end of which bears against the end of the recess 18. The spring 30 urges the slide member 28 against the shoulder 27, and thus applies a torque to the bolt 13 tending to rotate it into engagement with the abutment surface 17, and so into perpendicular relation to the bar 10.

In the outer face of the bar 10, there are provided a number of suitably located bolt holes 31 by means of which the clamp may be securely bolted on a machine tool or other suitable support. Internally threaded bores 32 extend transversely through the clamping bar 10 so that the clamp may be secured on its side to a machine tool or the like by means of bolts or similar means. The upper bar 11 is provided with similar threaded bores 32. A pair of bores or apertures 33 extending transversely through the bar 10, with their centers precisely spaced apart by half the length of a sine bar, or five inches, are provided to receive suitable pins by means of which measurements may conveniently be made.

The clamping bar 11 has extending therethrough perpendicular to its inner face a plurality of bores 34, each of sufficient diameter to receive therethrough with a slight clearance of the bolts 12 or 13, the bores 34 being spaced apart in correspondence with the spacing of the pivot axes of the bolts in the bar 10. On each of the clamping pins or bolts 12 and 13 there are threaded a pair of nut members 35, arranged to receive the bar 11 therebetween so that one may bear against the inner face of the bar and the other against the outer face so as to fix the bar in position on the pins or bolts and maintain it in clamping relation with the bar 10, whereby a work piece may be securely held therebetween. It will be apparent that by reason of the pivoting of the bolts 12 and 13 on the bar 10 and their perpendicular relation to the bar 11, the bars may be positioned in substantially parallel relation when the clamping pins or bolts are arranged perpendicular to the bar 10 by engagement of the bolt 13 against the abutment surface 17. Similarly, the bars may be arranged at an angle to each other by swinging of the clamping pins or bolts to an appropriate angle relative to the bar 10, thus bringing the bar 11 into angular relationship with the bar 10. In Fig. 1, the clamp is shown with the bars at an angle of substantially 15°, to accommodate a work piece W clamped therebetween which has surfaces extending at substantially 15° to each other, this being substantially the maximum of taper on a work piece which will permit the secure clamping of the piece. Pivoting of the bars from the perpendicular position is limited by the openings of the slots 14 in the inner face of bar 10.

At each end of each of the clamping bars 10 and 11, there is rotatably mounted a clamping jaw, so that two work pieces may simultaneously be clamped. The jaws are not identical, but all have certain common structure. The jaws 37, one at the left of the bar 10 and the other at the right of the bar 11 as viewed in Fig. 1, are identical, the simplest of those disclosed herein, and have substantially the entire structure thereof included in the structures of the other jaws. The description thereof thus constitutes in large part a description of the other jaws. Referring particularly to Figs. 1, 4 and 8, it will be seen that the jaw 37 is bounded at one end by a semi-circular surface, and is of substantially rectangular shape at the other end, its clamping face being substantially flat. The width of the jaw 37 is conveniently the same as that of the clamping bars, the rectangular end portion of the jaw corresponding substantially to the end of the clamping bar on which the jaw is mounted. Spaced about a circle on the center about which the semi-circular end surface is described, is a plurality, in this case four, of internally threaded apertures 38, and adjacent the rectangular end portion three similar threaded apertures 39 are provided on an arc about the same center. Internally threaded recesses 40 are provided in the end and side portions of the jaw, as best shown in Fig. 8. Apertures 38 and 39 and bores 40 provide for the bolting or other threaded securement of a work piece on the jaw. On the reverse face of the jaw there is a circular projecting portion 41 co-axial with and formed on substantially the same radius as the circular end portion of the jaw 37, so that half of the circumference of the portion 41 is common with the surface of the rounded end of the jaw. About the circumference of the portion 41 there are marked a series of graduations 42, in degrees or multiples or subdivisions thereof, by which the rotation of the jaw from a given position, such as the position in which it has its straight or flat end substantially flush with the end surface of the clamping bar, can be ascertained.

At each corner of the rectangular end portion of the jaw 37 is a projecting portion 43, each of the same height as the circular projecting portion 41, and separated transversely from each other by a space 44, both of the projections 43 also being spaced from the circular portion 41 as by an annular groove or the like into which opens the space 44. A suitable index mark, such as the mark 45, is provided on the side of the bar adjacent the inner face thereof for cooperation with the graduations 42 to indicate the rotation of the jaw 37. Each side of the clamping bar may have an index mark 45 thereon. It will be evident that when the jaw is rotated to a position in which the rectangular end portion thereof projects beyond the side of the clamping bar, over the index mark 45, the mark can still be seen and the graduations read, by reason of the space 44 between the projections 43 and/or the groove or space between the projections 43 and the circular portion 41.

Co-axial with the portion 41 is a stem 46 mounted on an internally threaded axial bore 47 extending therethrough with a circumferential groove 48 thereabout. The bore 47 has a counterbore 49 extending from the clamping face of the jaw, the counterbore providing a recess in which may be received the head of the bolt or screw by which a work-piece may be secured to an opposed jaw, so that the jaw 37 may properly clamp against the work piece. The stem 46 is received in a circular recess in the inner face of the clamping bar the depth of which is somewhat greater than the height of the stem. A bore 51 of smaller diameter than the recess extends from the opposite face of the associated clamping bar to open through the bottom of the recess, and has a counterbore 52 defining a shoulder 53. Set screws 54 extend from the opposite side faces of the clamping bar to engage in the groove 48 and retain the jaw in place. They may also be used to assist in holding the jaw against rotation. The jaw 37 is secured on the clamping bar by a bolt 55 which has a threaded portion screwed into the bore 47 and an enlarged unthreaded portion 57 which provides a shoulder or stop portion 58 engageable with the end of the stem 46. The head 59 of the bolt is disposed in the counterbore 52 and adapted to engage the shoulder 53. The length of the enlarged unthreaded shank portion 57 of the bolt 55 is such that when the stop portion 58 engages the end of the jaw stem 46, the head 59 of the bolt is lightly engaged against the shoulder 53. With this existing condition, it will be evident that the jaw 37 may readily be rotated on the inner face of the clamping bar although a certain amount of friction may be provided by means of the closeness of engagement of the bolt head 59 against the shoulder 53. If it is desired to secure the jaw 37 on the clamping bar in substantially non-rotatable relation, a washer or similar spacer 60 is disposed between the bolt head 59 and the shoulder 53, the spacer having a thickness sufficient to locate the stop portion 58 of the bolt out of engagement with the end of the stem 46. When the bolt is drawn up tightly, the jaw is clamped tightly against the inner face of the clamping bar and thus held against rotation. The set screws may be tightened on the stem 46 to held hold the jaw against rotation.

The jaw 61 at the left end of the clamping bar 11 as viewed in Fig. 1 comprises, as already indicated, substantially all of the structure of the jaw 37. The jaw 61 is provided with the threaded bores 38, 39 and apertures 40 for threaded securement of the work piece thereon, but does not have the recess or counterbore 49. In its clamping face, however, the jaw 61 has a pair of rectangularly related V-grooves 62 intersecting on the axis of the stem 46, to facilitate the engagement of work thereon. The jaw 61 also has in its clamping face a threaded bore 63, co-axial with and preferably opening into the bore 47 of the stem 46, and provided for the same purpose as the bores 38 and 39. On its reverse face, the jaw 61 has the projecting portions 41 and 43, together with the graduations 42 on the circular portion 41 to cooperate with an index mark or marks 45 on a side face of the bar. Extending through the jaw and circular portion 41 are a number of equally spaced index holes 64 arranged in a circle about the axis of the bore 63. The number of index holes 64 may vary, but in the case of the jaw 61 twenty-four of these holes are shown. The jaw 61 otherwise is substantially the same as the jaw 37, except that it also has formed on the circumference of the stem adjacent the end thereof, a plurality of teeth 65 which, in effect, form the end portion of the stem into a worm gear or worm wheel. The jaw 61 is rotatably mounted in the clamping bar 11 by means of the bolt 55, which in this case is shown with the stop portion 58 thereof engaging the stem, and with the spacer 60 omitted from between the bolt head 59 and the bore shoulder 53, a clearance being shown in Fig. 4, although it is to be understood that an actual clearance is not necessary. The set screws 54 engaging in the groove 48 of the stem retain the jaw against axial movement, as in the case of the jaw 37.

An indexing pin 67 is provided for engagement in the holes 64, the pin being projectable through a bore 68 in the inner face of the clamping bar 11, which has a counterbore 69 extending from the outer face of the bar to define a shoulder against which may engage an enlarged portion 70 of the pin which is disposed in the counterbore. The enlarged portion 70 of the pin has an end recess in which is engaged one end of a compression spring 71, the other end of which engages against a screw plug 72 engaging in a threaded outer portion of the counterbore 69. The spring 71 urges the pin 67 into projected position through the bore 68, the plug 72 serving to retain the spring and adjust the pressure thereof, and the projection of the pin 67 being limited by the engagement of the enlarged portion 70 against the shoulder defined by the counterbore 69. In the enlarged portion 70 of the indexing pin is a circumferential groove 73 cooperable with a cam for retraction of the pin from its projected position and releasing of the pin 67 from the retracted position for projection by the spring 71.

As best shown in Fig. 5, the cam comprises a cylindrical cam body 74 having an eccentrically located projection or lug 75 on one end thereof. The body is formed with a stop collar 76 longitudinally spaced from an enlarged head portion 77 at the other end of the cam body 74, and defining a retaining groove therewith. The cam is rotatably disposed in a bore 78 extending substantially normal to the counterbore 69 in which the enlarged indexing pin portion 70 is disposed, with the camming lug 75 engaged in the groove 73. The bore 78 preferably extends from one of the side faces of the clamping bar, and has a counterbore 79 at its outer end defining a shoulder on which the stop collar 76 engages to locate the lug 75 at the appropriate distance inwardly of the side face of the bar for engagement in the indexing groove 73 without binding against the bottom of the groove, and to bring the head portion 77 substantially flush with the surface of the bar.

Suitable means are provided for rotating the cam, in this case a recess 80 in the outer end of the cam body engageable by a suitable tool. It will be apparent that with the pin 67 in its projected position, as shown in Fig. 4, rotation of the cam body 74 will result in the cam lug 75 forcing the pin against the action of the spring 71 into retracted position within the clamping bar, completely out of engagement with the indexing hole 64 in the jaw 61. This of course allows the jaw 61 to be rotated to another position, whether with one of the indexing holes 64 located in alignment with the bore 68 to again receive the pin 67, or not. The pin may be released from its retracted position by rotation of the cam to throw the lug 75 sufficiently off the pin axis to allow the spring 71 to project against the pin. It will be understood that although the cam lug 75 is generally cylindrical, as best shown in Fig. 1, it is suitably flattened to avoid accidental dislodgment from the pin retracting position, and it will of course be obvious that the throw of the cam corresponds to the distance through which the indexing pin 67 moves between its retracted and projected positions. The cam is held against movement out of the bore 78 and counterbore 79 by any suitable means, as a set screw 81 (Figs. 1 and 3) engaging in the groove between the collar 76 and head 77.

With the pin 67 retracted, the jaw 61 may be rotated simply by grasping it with the fingers and turning it to a desired position. For convenience in turning the jaw when access thereto may be impeded by a work piece or for other reasons, however, the invention provides means for otherwise rotating the jaw. A bore 83 extends through the clamping bar substantially normal to the recess 50 in which the jaw stem 46 is disposed, the axis of the bore being offset from the axis of the recess a distance such that a common radial opening is provided, as will be clearly evident from Figs. 4 and 5. The bore 83 is threaded adjacent one end thereof, and has a counterbore 84 on the other end. A worm generally designated 85 is disposed in the bore 83 and counterbore 84, having a shaft 86 on which is formed a worm thread 87 which meshes with the teeth 65 formed on the stem 46. At one end of the worm shaft 86 there is formed an enlarged head 88, and spaced inwardly therefrom is a stepped collar 89, the larger portion of which engages the shoulder defined between the bore 83 and counterbore 84, and the smaller portion of which engages in the bore 83. A retaining groove is defined between the head 88 and collar 89, this portion of the shaft 86 being enlarged. It may be noted that a somewhat similar groove is defined between the collar 89 and the adjacent end of the worm thread 87, spaced inwardly of the collar.

The other end of the shaft 86 is reduced, as shown at 90, for journalled engagement in a bearing or bushing 91 screwed into the threaded end portion of the bore 83. The bushing is formed with a screw-driver slot 92 or the like in its outer end so that it may readily be inserted or removed. It will be understood that the bushing need not be threadedly mounted in the clamping bar, but may be smooth and rotatable in a smooth bore portion, so that it may turn without moving axially, the screw 93 being employed as with the threaded bushing shown. A set screw 93, as shown in Figs. 3 and 4, is employed to secure the bushing 91 in its inserted position. At the head end portion of the worm shaft, there is provided a recess or socket 94 for co-operation with a suitable tool to effect rotation of the worm 85 when it is desired to turn the jaw 61. A set screw 95 (Fig. 3), similar to the set screw 93, is employed to engage in the groove between the enlarged head 88 and the collar 89 to retain the worm 85 against outward movement due to the thrust developed by the reaction between the worm thread 87 and the worm teeth 65. It will be evident that the indexing pin 67 must be retracted out of engagement with the jaw in order to allow the worm gearing to operate effectively in rotating the jaw. The meshed worm and teeth will lock the jaw against rotation by hand as previously described, so that the worm 85 must be moved out of engagement with the teeth 65 of the jaw stem 46. Such disengagement is readily effected by disengaging the set screw 95 from the work 85, rotating the worm so that it is shifted axially outwardly from the bore 83 and counterbore 84 by reaction with the teeth 65 until the worm thread 87 is disengaged from the teeth 65, when the shoulder 89 will be positioned adjacent the side face of the clamping bar. The set screw 95 is then brought to engage the groove between the collar 89 and the adjacent end of the worm thread, and thus holds the worm 85 out of engagement with the teeth 65, and yet retains it against loss and in a convenient position for re-engaging the worm teeth 65.

The worm 85 is adjustably mounted for movement radially of the stem 46 so as to compensate for wear or improper positioning of the parts. This compensatory adjustment or movement is provided for by forming the bore or aperture 96 of the bushing 91 eccentric, as best appears in Fig. 5, so that by rotating the bushing 91 the reduced end portion of the shaft 86 will be moved toward or from the toothed portion of the jaw stem 46, and thus effect closer or looser engagement of the worm thread 87 with the stem teeth. The eccentricity of the bushing aperture may be sufficiently great to effect complete disengagement of the worm thread 87 from the teeth 65, if desired. It is noted that to permit such shifting of the worm 85 radially, clearances are provided between the stepped collar 89 and the head 88 in the respective bore and counterbore as indicated at 97 and 98 in Fig. 5. Binding or jamming of the worm 85 when an adjustment is made is thus avoided.

At the right hand end of the clamping bar 10 as viewed in Fig. 1 is a jaw 100, shown in greater retail in Fig. 7, is identical to the jaw 61 except for the fact that the number of indexing holes 64 differs from the number employed in the jaw 61, twenty holes 64 being employed in the jaw 100 in the present instance. The jaw 100 is mounted in the same manner as the jaw 61, and has associated therewith the indexing pin 67 and the worm 85 and the several attendant elements as described hereinabove.

It will be obvious that the clamp of this invention may be employed to secure two work pieces at the same time, by reason of the provision of a pair of jaws at each end thereof, or other appropriate means being employed to compensate for any differences in shape or contour of the two work pieces. It is to be pointed out that two of the clamping pins or bolts 12 and 13 are sufficient to provide for proper clamping of a work piece or work pieces, so that if a work piece is of such size and/or shape it cannot be clamped between a pair of jaws at one end of the clamp because the adjacent bolt 12 prevents the piece from being inserted sufficiently far between the bars 10 and 11, or in other words interferes with the proper clamping of the piece between the adjacent pair of jaws, the pin or bolt 12 in question may be removed so that the particular workpiece can be accommodated. Removal of the pin or bolt is readily accomplished by first removing the pivot bolt 15, so that the bolt 12 is freed from the clamping bar 10, and then removing from the clamping bolt the nut member 35 thereon, which engages the outer face of the bar 11, drawing the pin or bolt through the slot 14 so that its pivot end projects outwardly of the bar 10, and unscrewing the other nut member 35 and bolt from each other so that the bolt may be completely withdrawn from the clamping bar 11 and through the slot 14 of the bar 10. It will be apparent that this may be accomplished even if the clamp be secured on a machine tool or other support by means of the threaded bores 32, although of course if the clamp were secured in place with the outer face openings of the slots 14 blocked, the clamp would first have to be removed from the support.

From the foregoing description, it will be evident that the various objects and purposes of the invention have been achieved in a simple and effective manner, and that the invention provides numerous advantages over previously known clamps.

Having thus described my invention, it will be obvious that various modifications may be made in the same without departing from the spirit of the invention; hence, I do not wish to be understood as limiting myself to the exact form, construction, arrangement, and combination of parts herein shown and described, or uses mentioned.

I claim:

1. A clamp construction comprising first and second clamp bars disposable in facing relation with inner faces thereof in opposition, a plurality of aligned slots extending through said first clamp bar, a plurality of clamping bolts pivoted at one end in said slots to swing between predetermined limiting positions relative to the first bar about axes transverse of the slots and spaced longitudinally of the bar, means defining one of said bolt positions at substantially right angles to the first bar, means biasing at least one of said bolts to said one position, a plurality of parallel bores extending through said second bar spaced in correspondence to the spacing of said bolt pivot axes and each receiving a bolt therethrough, a pair of nut members on each bolt disposed with the second bar extending therebetween for securement thereby in adjusted position on each bolt, a clamping jaw mounted at each end of each bar rotatable on the inner face thereof, said jaws each having spaced portions to bear on the inner bar face including a peripherally graduated circular portion, a stem extending from said circular portion having an external peripheral groove and an internal threaded bore, a recess in the inner bar face rotatably receiving said stem, means engaging in said groove to maintain the jaw engaged on the bar, a bore in the bar co-axial with and open to said recess and having a counterbore defining an abutment therein, a securing bolt having a reduced threaded end portion engageable in said stem bore and defining a shoulder abuttable with the end of said stem and also having a head rotatably engaged on said abutment upon abutting engagement of said shoulder and stem end to permit rotation of the jaw, a spacer disposable between said head and abutment of thickness sufficient to space said shoulder from said stem end to effect non-rotatable clamping of the jaw against said inner face by said securing bolt, index marking means on each of said bars adjacent the graduated circular portions of the jaws thereon, indexing means for at least certain of said jaws comprising an indexing pin mounted in slidable relation within a bar adjacent an associated jaw and projectable outwardly through said inner bar face to engage the jaw, means biasing said pin outwardly, and a plurality of holes in the associated jaw equally spaced from the axis of said jaw stem each adapted to receive the indexing pin, cam means for retracting the indexing pin within the bar including a member mounted in the bar for rotation about an axis intersecting the axis of the indexing pin, said rotatable member having an interior end adjacent said pin and a camming projection on said end eccentric of its axis engageable with the pin for movement thereof out of projected position upon turning of said rotatable member, means for rotating at least certain of said jaws comprising a worm gear formed on a jaw stem, a worm shaft carrying a worm meshing with said teeth rotatably mounted within the associated bar for turning said jaw stem and thereby said jaw, a bearing member rotatably mounted in said associated bar co-axially with said worm shaft and eccentrically journalling one end of the shaft for adjustment of the worm toward or from said gear upon rotation of the bearing member, means for securing the worm on the bar in unmeshing relation to said gear including an enlargement on said worm shaft spaced from an end of the worm to define therewith a groove, and a retaining member on the bar engageable in said groove upon axial movement of said shaft positioning the worm out of engagement with the worm gear, certain of said jaws having a substantially flat work-engaging face with a recess therein centered on the axis of said jaw stem bore, and means for securing the clamp bars on a support.

2. A clamp construction comprising first and second clamp bars disposable in facing relation with inner faces thereof in opposition, a plurality of clamping pins pivoted at one end on said first clamp bar to swing about axes transverse of and spaced longitudinally of the bar, a plurality of parallel bores extending through said second bar spaced in correspondence to the spacing of said bolt pivot axes and each receiving a bolt therethrough, a pair of nut members on each bolt receiving the second bar therebetween for securement thereby, a clamping jaw mounted at each end of each bar rotatable on the inner face thereof, said jaws each having an internally threaded stem extending therefrom, a recess in the inner bar face rotatably receiving said stem, means engaging the jaw for retention thereof on the bar, a bore in the bar co-axial with and open to said recess and having a counterbore defining an abutment therein, a securing bolt having a reduced end portion threaded in said stem and defining a shoulder abuttable with the end of said stem and also having a head rotatably engaged on said abutment upon abutting engagement of said shoulder and stem end to permit rotation of the jaw, a spacer disposable between said head and abutment of thickness sufficient to space said shoulder from said stem end to effect non-rotatable clamping of the jaw against said inner face by said securing bolt, and means for rotating at least certain of said jaws.

3. A clamp construction comprising first and second clamp bars disposable in facing relation with inner faces thereof in opposition, a plurality of clamping pins pivoted at one end on said first clamp bar to swing about axes transverse of and spaced longitudinally of the bar, means for securing the second bar on the pins in clamping relation to the first bar, clamping jaws rotatably mounted at adjacent ends of said bars in facing relation, means for non-rotatably clamping the jaw against the respective inner bar faces, means for rotating at least certain of said jaws comprising a worm gear formed on a jaw stem, a worm shaft carrying a worm meshing with said teeth rotatably mounted within the associated bar for turning said jaw stem and thereby said jaw, a bearing member rotatably mounted in said associated bar co-axially with said worm shaft and eccentrically journalling one end of the shaft for adjustment of the worm toward or from said gear upon rotation of the bearing member, and means for securing the worm on the bar in unmeshing relation to said gear including an enlargement on said worm shaft spaced from an end of the worm to define therewith a groove, and a retaining member on the bar engageable in said groove upon axial movement of said shaft positioning the worm out of engagement with the worm gear.

4. A clamp construction comprising first and second clamp bars disposable in facing relation with inner faces thereof in opposition, means for disposing said bars in clamping relation, clamping jaws rotatably mounted at adjacent ends of said bars in facing relation, indexing means for at least certain of said jaws comprising an indexing pin mounted in slidable relation within a bar adjacent an associated jaw and projectable outwardly through said inner bar face to engage the jaw, means biasing said pin outwardly, and a plurality of holes in the associated jaw equally spaced from the axis thereof each adapted to receive the indexing pin, and cam means for retracting the indexing pin within the bar including a member mounted in the bar for rotation about an axis intersecting the axis of the indexing pin, said rotatable member having an interior end adjacent said pin and a camming projection on said end eccentric of its axis engageable with the pin for movement thereof out of projected position upon turning of said rotatable member.

5. A clamp construction comprising first and second clamp bars arranged in facing relation with inner faces thereof in opposition, a plurality of clamping pins pivotally mounted on said first bar on longitudinally spaced axes transverse thereof to swing between predetermined limiting positions, means defining one of said positions at substantially right angles to the first bar, means biasing at least one of said clamping pins to said one position, said biasing means comprising a shoulder formed on a pin, a slide member engageable in one direction of movement thereof with said shoulder, and spring means urging said slide member against the shoulder in said one direction, a plurality of openings in said second bar receiving the clamping pins therethrough, means for securing the second bar on the pins in clamping relation to the first bar, and clamping jaws mounted at adjacent ends of said bars in facing relation.

6. A clamp construction substantially as set forth in claim 1, wherein said bolt-biasing means comprises a shoulder formed on the pivoted end of a bolt, a sliding member engageable with said bolt shoulder, and spring means urging said sliding member against the bolt shoulder in a direction tending to swing said bolt to said one limiting position.

7. A clamp construction comprising a pair of clamping bars one of which has pivotally mounted therein in longitudinally spaced relation a plurality of clamping bolts and the other of which has a plurality of parallel openings receiving said bolts therethrough, nuts on the bolts engageable with said other bar for securement thereof on the bolts, clamp jaws rotatably mounted at adjacent ends of said bars in facing relation, means for effecting rotation of at least one of a pair of said facing jaws, indexing means for locating each jaw associated with such rotating means in a selected one of a plurality of rotated positions, an axial recess in a jaw facing such associated jaw, means biasing at least one of said bolts to a predetermined position relative to said one bar, and means for securing at least one of said bars to a support.

8. A clamp construction comprising a pair of clamping bars one of which has pivotally mounted thereon in longitudinally spaced relation a plurality of clamping pins and the other of which has a plurality of parallel openings receiving said pins therein, means for securing said other bar, clamp jaws rotatably mounted at adjacent ends of said bars in facing relation, and means for effecting rotation of a pair of said facing jaws, said one jaw having work-engageable means for rotating work therewith, and the other jaw of a pair having a substantially flat surface permitting rotation of the work thereon.

9. A clamp construction comprising a pair of clamping bars, a plurality of clamping pins pivotally mounted on one of said bars in longitudinally spaced relation, a plurality of openings in the other bar receiving said clamping pins therein, means for securing said other bar on the pins in clamping relation to said one bar, clamping jaws mounted at adjacent ends of the bars in facing relation, means for securing a workpiece to a jaw, means on one of a pair of said facing jaws for retaining engagement with said securing means, and a recess in the other jaw of said pair to accommodate the securing means and allow said other jaw to engage clampingly on said workpiece.

10. A clamp construction comprising a pair of elongated clamping bars, a plurality of clamping bolts carried by one of said bars, means for pivotally connecting said bolts to such bar for pivotal movement on parallel axes longitudinally spaced along such bar, each axis extending at right angles to the axis of the corresponding bolt and at right angles to the longitudinal axis of such bar, the other of said clamping bars having spaced openings therein corresponding to the respective bolts and each adapted to receive one of such bolts whereby said bars are assembled with corresponding ends in opposed relation, the openings in said bar being proportioned to provide changes in the distances between the axes of the bolts resulting from pivotal movement of the latter to position the bars in non-parallel relation, and means cooperable with said bolts to exert clamping forces on said bars and an object disposed therebetween.

11. A clamp construction as defined in claim 10, wherein one of said bolts is provided with means biasing said bolt in a predetermined position relative to the bar carrying the same.

References Cited in the file of this patent

UNITED STATES PATENTS

| | | |
|---|---|---|
| 1,162,343 | Curran et al. | Nov. 30, 1915 |
| 1,366,409 | Munschauer | Jan. 25, 1921 |